(12) United States Patent
Watanabe et al.

(10) Patent No.: US 7,580,622 B2
(45) Date of Patent: Aug. 25, 2009

(54) IMAGING APPARATUS

(75) Inventors: Nobuyuki Watanabe, Yokohama (JP); Fumiyuki Shiratani, Sagamihara (JP); Noriyuki Iyama, Hachioji (JP); Shinichi Mihara, Tama (JP); Hiroyuki Minakata, Hachioji (JP)

(73) Assignee: Olympus Corporation, Tokyo (JP)

( * ) Notice: Subject to any disclaimer, the term of this patent is extended or adjusted under 35 U.S.C. 154(b) by 595 days.

(21) Appl. No.: 11/260,735

(22) Filed: Oct. 27, 2005

(65) Prior Publication Data
US 2006/0126081 A1    Jun. 15, 2006

(30) Foreign Application Priority Data
Oct. 29, 2004    (JP)    ............... 2004-316365

(51) Int. Cl.
*G03B 17/00*    (2006.01)
(52) U.S. Cl. ..................... 396/60; 348/240.1
(58) Field of Classification Search ............. 396/60, 396/72, 79, 82; 348/240.1, 240.2, 358; 345/660; 359/680, 689
See application file for complete search history.

(56) References Cited

U.S. PATENT DOCUMENTS

| 6,728,482 B2 * | 4/2004 | Hagimori et al. ............... 396/72 |
| 2005/0046711 A1 * | 3/2005 | Morimoto ................ 348/240.2 |
| 2005/0083350 A1 * | 4/2005 | Battles ....................... 345/660 |

FOREIGN PATENT DOCUMENTS

| JP | 62-92679 | 4/1987 |
| JP | 6-339083 A | 12/1994 |
| JP | 10-42183 A | 2/1998 |
| JP | 11-23949 A | 1/1999 |
| JP | 2000-295530 A | 10/2000 |
| JP | 2002-182302 A | 6/2002 |
| JP | 2002182302 A | * 6/2002 |
| JP | 2002-249968 A | 9/2002 |
| JP | 2002-314868 A | 10/2002 |
| JP | 2002-341396 | 11/2002 |
| JP | 2003-283910 A | 10/2003 |
| WO | WO 2004/051987 A1 | 6/2004 |

OTHER PUBLICATIONS

Japanese Office Action dated Feb. 10, 2009 (3 pages), and English translation thereof (4 pages) issued in counterpart Japanese Application No. 2006-246129.

* cited by examiner

*Primary Examiner*—Melissa J Koval
*Assistant Examiner*—Autumn Parker
(74) *Attorney, Agent, or Firm*—Frishauf, Holtz, Goodman & Chick, P.C.

(57) ABSTRACT

An imaging apparatus comprises an optical magnification changing mechanism which optically changes a magnification of an image, and an electronic magnification change mechanism which reduces or expands a magnification with respect to image data by signal processing. The optical magnification changing mechanism is configured so that a magnification is discrete and a focal position changes together with a focal distance. The electronic magnification change mechanism carries out an interpolation process such that the number of pixels is increased with respect to a predetermined region of read image data during an expanding process, and carried out a process for discretely sampling a wide region as compared with a readout region obtained by the sampling provided when no magnification conversion is made, during a reducing process, thereby offsetting a change of the focal position in the optical magnification changing mechanism.

23 Claims, 10 Drawing Sheets

Thinning-out readout (All pixels) Block readout (All pixels) Block readout + Expanding process Expanding process

| c1 | c2 | c3 | c4 | c5 | c6 | s1 | s2 | d1 | d2 | k1 | k2 | out |
|---|---|---|---|---|---|---|---|---|---|---|---|---|
| i0 | i1 | i2 | i3 | i4 | i5 | 0 | 0 | i2 | i4 | 1 | 0 | 1×i2 + 0×i4 |
| i1 | i2 | i3 | i4 | i5 | i6 | 0 | 0 | i3 | i5 | 5/6 | 1/6 | 5/6×i3 + 1/6×i5 |
| i2 | i3 | i4 | i5 | i6 | i7 | 0 | 0 | i4 | i6 | 5/6 | 1/6 | 5/6×i4 + 1/6×i6 |
| i3 | i4 | i5 | i6 | i7 | i8 | 0 | 0 | i5 | i7 | 3/4 | 1/4 | 3/4×i5 + 1/4×i7 |
| i4 | i5 | i6 | i7 | i8 | i9 | 1 | 1 | i4 | i6 | 1/6 | 5/6 | 1/6×i4 + 5/6×i6 |
| i5 | i6 | i7 | i8 | i9 | i10 | 1 | 1 | i5 | i7 | 1/12 | 11/12 | 1/12×i5 + 11/12×i7 |
| i6 | i7 | i8 | i9 | i10 | i11 | 0 | 0 | i8 | i10 | 1 | 0 | 1×i8 + 0×i10 |
| i7 | i8 | i9 | i10 | i11 | i12 | 0 | 0 | i9 | i11 | 5/6 | 1/6 | 5/6×i9 + 1/6×i11 |
| i8 | i9 | i10 | i11 | i12 | i13 | 0 | 0 | i10 | i12 | 5/6 | 1/6 | 5/6×i10 + 1/6×i12 |
| i9 | i10 | i11 | i12 | i13 | i14 | 0 | 0 | i11 | i13 | 3/4 | 1/4 | 3/4×i11 + 1/4×i13 |
| i10 | i11 | i12 | i13 | i14 | i15 | 1 | 1 | i10 | i12 | 1/6 | 5/6 | 1/6×i10 + 5/6×i12 |
| i11 | i12 | i13 | i14 | i15 | i16 | 1 | 1 | i11 | i13 | 1/12 | 11/12 | 1/12×i11 + 11/12×i13 |
| i12 | i13 | i14 | i15 | i16 | i17 | 0 | 0 | i14 | i16 | 1 | 0 | 1×i14 + 0×i16 |
| i13 | i14 | i15 | i16 | i17 | i18 | 0 | 0 | i15 | i17 | 5/6 | 1/6 | 5/6×i15 + 1/6×i17 |
| i14 | i15 | i16 | i17 | i18 | i19 | 0 | 0 | i16 | i18 | 5/6 | 1/6 | 5/6×i16 + 1/6×i18 |
| i15 | i16 | i17 | i18 | i19 | i20 | 1 | 1 | i17 | i19 | 3/4 | 1/4 | 3/4×i17 + 1/4×i19 |
| i16 | i17 | i18 | i19 | i20 | i21 | 1 | 1 | i16 | i18 | 1/6 | 5/6 | 1/6×i16 + 5/6×i18 |
| i17 | i18 | i19 | i20 | i21 | i22 | 0 | 0 | i17 | i19 | 1/12 | 11/12 | 1/12×i17 + 11/12×i19 |
| i18 | i19 | i20 | i21 | i22 | i23 | 0 | 0 | i20 | i22 | 1 | 0 | 1×i20 + 0×i22 |
| i19 | i20 | i21 | i22 | i23 | i24 | 0 | 0 | i21 | i23 | 5/6 | 1/6 | 5/6×i21 + 1/6×i23 |
| i20 | i21 | i22 | i23 | i24 | i25 | 0 | 0 | i22 | i24 | 5/6 | 1/6 | 5/6×i22 + 1/6×i24 |

FIG. 8

IMAGING APPARATUS

CROSS-REFERENCE TO RELATED APPLICATIONS

This application is based upon and claims the benefit of priority from prior Japanese Patent Application No. 2004-316365, filed Oct. 29, 2004, the entire contents of which are incorporated herein by reference.

BACKGROUND OF THE INVENTION

1. Field of the Invention

The present invention relates to an imaging apparatus comprising an optical magnification changing mechanism and an electronic magnification change mechanism.

2. Description of the Related Art

In a video camera or a digital camera having a zoom lens system, a zoom ratio is changed by moving a zoom lens, whereby a focal distance is changed to a telephoto side or a wide-angle side while a focal position is kept constant, thereby changing an object distance. However, when configuring a small imaging element, optical zooming from the wide-angle side to the telephoto side changes not continuously but in a stepwise manner when a design is made such that a group number of lenses is decreased.

As shown in FIG. 10, an optical system includes: a first lens group 1001 having a negative refractive power, the first lens group being fixed during magnification change or focusing; and a second lens group 1002 which moves during magnification change or focusing, sequentially from an object side. In the optical system, an image surface changes in a curved shape as illustrated in the case where a position of the second lens group 1002 has been moved as illustrated. Because there is only one group of drive sections, a focus and an image magnification unavoidably change at the same time, and a configuration desired by a user cannot be always produced.

In the case where the object has moved to a position which corresponds to a curve indicated by a' while focusing is carried out for an object which corresponds to a curve indicated by "a" shown in FIG. 10, an angle of view moves to the wide-angle side by carrying out focusing.

As is obvious from FIG. 10, a' is close to an infinite point compared with "a". That is, when an object of interest is distant near a wide angle, an angle of view moves to the wide-angle side due to focusing, resulting in unnatural feeling. In addition, in the case of the telephoto side, the object is made distant, whereby the angle of view becomes small. In this case, the object is made distant, whereby an expansion direction is obtained, and thus, a problem is not so serious as that at the wide-angle side.

On the other hand, as shown in FIG. 12, when lens types 1031, 1032, and 1033 having positive, negative, and positive configurations, respectively, are used, the object is made distant at the wide-angle side, whereby the object is zoomed in. In some cases, a preferable result is obtained. However, at the telephoto side, the angle of view changes in a wider direction due to focusing with respect to a distant object. In this case, a framing change occurs due to lens focusing rather than framing intended by the user, and this change is unavoidably used. Further, there occurs a problem with focusing and framing of a still object as well.

FIG. 13 is a view adopted to explain this problem. In FIG. 13, as a result of that the user focuses with an attempt to image objects "a" and "b" while intending to obtain an angle of view 1022, the angle of view 1022 appears like an element 1023, and part of the object "b" becomes missing.

Furthermore, in the case of macro imaging, a focal change is large, and thus, a change of an angle of view is also large. However, a zoom optical system in which only one group shown in FIGS. 10 to 12 is movable can reduce the number of lenses and can simplify a drive section. This makes possible a configuration of stepwise zooming while achieving downsizing and low cost.

Jpn. Pat. Appln. KOKAI Publication No. 6-339083 discloses that magnifications of a two-focus optical system and an optical finder with a zoom are coincided with each other by using a magnification changing process with electronic zooming. A technique of compensating for a change of an angle of view at the time of focusing by means of electronic zooming is disclosed in Jpn. Pat. Appln. KOKAI Publication Nos. 2002-182302 and 11-23949, in which unnatural feeling of the user is reduced by smoothly changing a magnification of electronic zooming to a target magnification. In addition, Jpn. Pat. Appln. KOKAI Publication No. 2003-283910 discloses that, in order to substantially match angles of view of an optical finder and imaging system while a drive control system of the optical finder and a stepwise zooming imaging lens is used in common, the stepwise zooming at a magnification, which does not exceed a magnification of the optical finder but is proximal thereto, is selected when the magnification is specified, and adjustment of an angle of view is carried out by electronic zooming.

On the other hand, in recent years, a video camera has incorporated an electronic zooming function for electronically changing an image magnification by using an imaging element other than such optical zooming. The electronic zooming function is a function of changing a focal distance to the telephoto side without moving a zoom lens so as to convert an imaging signal in the region which is smaller than a light receiving screen area of the imaging element to a video signal which corresponds to the light receiving screen size.

In a video camera having such an electronic zooming function, an imaging region which is greater than the area of the image sensor cannot be obtained. For this reason, zooming to the wide-angle side has not be successfully achieved although zooming to the telephoto side can be achieved. In contrast, there is proposed an apparatus and a method for substantially generating an image at the wide-angle side while fixing a lens by utilizing a difference between the number of pixels of the imaging element and the number of pixels of an output image. An imaging apparatus enabling such electronic zooming includes an imaging apparatus disclosed in Jpn. Pat. Appln. KOKAI Publication No. 2000-295530, for example. This publication discloses a solid state imaging apparatus having photoelectric conversion pixels arranged two-dimensionally, for randomly providing an access to the photoelectric conversion pixels, the apparatus comprising first skipping means for reading out an arbitrarily specified pixel in an arbitrarily specified region and second skipping means for reading out an image region which is smaller than an image frame read out by the first skipping means, wherein the number of pixels read out by the first and second skipping means are made equal to each other.

Further, Jpn. Pat. Appln. KOKAI Publication No. 10-42183 discloses an imaging apparatus comprising: first adjusting means for optically changing an angle of view of an image; a second adjusting means for electrically changing an angle of view of an image; and control means for controlling the first adjusting means and the second adjusting means to determine an angle of view, wherein the control means has been configured to adjust an angle of view to a desired angle of view by the second adjusting means and substantially move the control of the angle of view from the second adjusting means to the first adjusting means while maintaining the angle of view. The imaging apparatus uses a CCD type imaging element. When electronic zooming is carried out, all pixels are read out from the CCD type imaging element, and the read-out pixels are temporarily stored in a frame memory or the like. Then, an electrical interpolating process is carried out on the basis of a pixel signal relating to a small number of pixels included in a partial area of a full angle of view.

Moreover, Jpn. Pat. Appln. KOKAI Publication No. 2002-314868 discloses an imaging apparatus using an imaging element which is capable of specifying a readout position and range on the imaging element by reading out a photoelectric conversion signal on the imaging element in accordance with an X-Y address system, and further, carrying out thinning-out readout based on the same number of clocks. There is disclosed that the imaging apparatus makes control by using electronic zooming means for carrying out electronic zooming for changing an isolation angle of view which is obtained as an isolation range of an imaging position and an imaging angle of view; and the electronic zooming and optical zooming in combination, whereby a zooming range of an output angle of view associated with a finally output image signal is controlled so as to be substantially wider than any of an optical zoom range which can be produced by only a change of the imaging angle of view and an electronic zoom range which can be produced by only a change of the isolation angle of view.

In addition, Jpn. Pat. Appln. KOKAI Publication No. 2002-249968 proposes a method of reducing distortion of an image obtained during readout with respect to distortion of an image caused by thinning-out readout by using spatial and temporal interpolation, and obtaining a high quality image, wherein a step width of the thinning-out readout can be finely produced to a certain degree.

BRIEF SUMMARY OF THE INVENTION

According to a first aspect of the present invention, there is provided an imaging apparatus having an imaging element which converts an optically formed image to an electrical signal by means of photoelectric conversion, thereby acquiring image data, the imaging apparatus comprising: an optical magnification changing mechanism which optically changes a magnification of an image; and an electronic magnification change mechanism which reduces or expands a magnification with respect to image data by signal processing, the imaging apparatus providing a magnification-changed image according to a predetermined magnification based on the optical magnification changing mechanism and the electronic magnification change mechanism, wherein the optical magnification changing mechanism is a configuration in which a magnification is discrete and a focal position changes together with a focal distance, and the electronic magnification change mechanism carries out an interpolating process such that the number of pixels is increased with respect to a predetermined region of read image data during an expanding process; and carries out a process for discretely sampling a wide region as compared with a readout region obtained by the sampling provided when no magnification change is made, during a reducing process, and converting the sampled region data to predetermined image data by a correcting process, thereby offsetting a change of the focal position in the optical magnification changing mechanism.

According to a second aspect of the present invention, there is provided an imaging apparatus according to the first aspect, comprising a focus adjusting section which detects a focus state of an object and moves a movable section of the optical magnification changing mechanism according to a result of the detection.

According to a third aspect of the present invention, there is provided an imaging apparatus according to the first aspect, wherein the optical magnification changing mechanism includes an optical system in which a magnification is produced as x–1 at an arbitrary position in an interval at which a partial group having the largest change of a delay magnification relating to a telephoto point during movement can move from among partial groups of lens systems which moves on an optical axis.

According to a fourth aspect of the present invention, there is provided an imaging apparatus according to the first aspect, wherein the optical magnification changing mechanism includes an optical system which includes: a first lens group fixed during magnification change/focusing; and a second lens group that moves during magnification change or focusing sequentially from the object side, and in which a magnification is produced as x–1 at an arbitrary position in an interval at which the second lens group can move.

According to a fifth aspect of the present invention, there is provided an imaging apparatus according to the first aspect, wherein a total number of pixels read from the imaging element for the purpose of the expanding process by the electronic magnification change mechanism and a total number of pixels read from the imaging element for the purpose of the reducing process by the electronic magnification change mechanism are constant.

According to a sixth aspect of the present invention, there is provided an imaging apparatus according to the first aspect, wherein the optical magnification changing mechanism includes an optical system which includes: a first lens group having a negative refractive power, the first lens group being fixed during magnification change/focusing; and a second lens group having a positive refractive power, the second lens group moving during magnification change or focusing, sequentially from the object side, and in which a magnification is produced as x–1 at an arbitrary position in an interval at which the second lens group can move.

According to a seventh aspect of the present invention, there is provided an imaging apparatus according to the first aspect, wherein the optical magnification changing mechanism includes an optical system which includes: a first lens group having a negative refractive power, the first lens group being fixed during magnification change/focusing, a second lens group having a positive refractive power; the second lens group moving during magnification change or focusing; and a third lens group having a positive refractive power, the third lens group being fixed during magnification change/focusing, sequentially from the object side, and in which a magnification is produced as x–1 at an arbitrary position in an interval at which the second lens group can move.

According to an eighth aspect of the present invention, there is provided an imaging apparatus according to the sixth aspect, wherein, when, in one lens disposition at a wide-angle side, a focal surface corresponding to an object of interest is present to be closer than the imaging element surface if viewed from a main plane of a final lens in the lens disposition, the expanding process is carried out by the electronic magnification change mechanism in order to compensate for widening of an angle of view together with movement of the moving group caused by focusing.

According to a ninth aspect of the present invention, there is provided an imaging apparatus according to the seventh aspect, wherein, when, in one lens disposition at a wide-angle side, a focal surface corresponding to an object of interest is present to be closer than the imaging element surface if viewed from a main plane of a final lens in the lens disposition, the expanding process is carried out by the electronic magnification change mechanism in order to compensate for widening of an angle of view together with movement of the moving group caused by focusing.

According to a tenth aspect of the present invention, there is provided an imaging apparatus according to the sixth aspect, wherein, when, in one lens disposition at a wide-angle side, a focal surface corresponding to an object of interest is present to be more distant than the imaging element surface if viewed from a main plane of a final lens in the lens disposition, the reducing process is carried out by the electronic magnification change mechanism in order to compensate for high magnification of an angle of view together with movement of the moving group caused by focusing.

According to an eleventh aspect of the present invention, there is provided an imaging apparatus according to the sixth aspect, wherein, when, in one lens disposition at a wide-angle side, a focal surface corresponding to an object of interest is present to be more distant than the imaging element surface if viewed from a main plane of a final lens in the lens disposition, the reducing process is carried out by the electronic magnification change mechanism in order to compensate for high magnification of an angle of view together with movement of the moving group caused by focusing.

According to a twelfth aspect of the present invention, there is provided an imaging apparatus according to the sixth aspect, wherein, when, in one lens disposition at a high magnification side, a focal surface corresponding to an object of interest is present to be closer than the imaging element surface if viewed from a main plane of a final lens in the lens disposition, the reducing process is carried out by the electronic magnification change mechanism in order to compensate for high magnification of an angle of view together with movement of the moving group caused by focusing.

According to a thirteenth aspect of the present invention, there is provided an imaging apparatus according to the seventh aspect, wherein, when, in one lens disposition at a high magnification side, a focal surface corresponding to an object of interest is present to be closer than the imaging element surface if viewed from a main plane of a final lens in the lens disposition, the reducing process is carried out by the electronic magnification change mechanism in order to compensate for high magnification of an angle of view together with movement of the moving group caused by focusing.

According to a fourteenth aspect of the present invention, there is provided an imaging apparatus according to the sixth aspect, wherein, when, in one lens disposition at a high magnification side, a focal surface corresponding to an object of interest is present to be more distant than the imaging element surface if viewed from a main plane of a final lens in the lens disposition, the expanding process is carried out by the electronic magnification change mechanism in order to compensate for widening of an angle of view together with movement of the moving group caused by focusing.

According to a fifteenth aspect of the present invention, there is provided an imaging apparatus according to the seventh aspect, wherein, when, in one lens disposition at a high magnification side, a focal surface corresponding to an object of interest is present to be more distant than the imaging element surface if viewed from a main plane of a final lens in the lens disposition, the expanding process is carried out by the electronic magnification change mechanism in order to compensate for widening of an angle of view together with movement of the moving group caused by focusing.

According to a sixteenth aspect of the present invention, there is provided an imaging apparatus according to the first aspect, wherein the optical magnification changing mechanism includes an optical system which includes: a first lens group having a positive refractive power, the first lens group being fixed during magnification change/focusing; a second lens group having a negative refractive power, the second lens group moving during magnification change or focusing; and a third lens group having a positive refractive power, the third lens group being fixed during magnification change or focusing, and in which a magnification is produced as x−1 at an arbitrary position in an interval at which the second lens group can move.

According to a seventeenth aspect of the present invention, there is provided an imaging apparatus according to the twelfth aspect, wherein, when, in one lens disposition at a wide-angle side, a focal surface corresponding to an object of interest is present to be closer than the imaging element surface if viewed from a main plane of a final lens in the lens disposition, the reducing process is carried out by the electronic magnification change mechanism in order to compensate for high magnification of an angle of view together with movement of the moving group caused by focusing.

According to an eighteenth aspect of the present invention, there is provided an imaging apparatus according to the sixth aspect, wherein, when, in one lens disposition at a wide-angle side, a focal surface corresponding to an object of interest is present to be more distant than the imaging element surface if viewed from a main plane of a final lens in the lens disposition, expansion is carried out by the electronic magnification change mechanism in order to compensate for widening of an angle of view together with movement of the moving group caused by focusing.

According to a nineteenth aspect of the present invention, there is provided an imaging apparatus according to the seventh aspect, wherein, when, in one lens disposition at a wide-angle side, a focal surface corresponding to an object of interest is present to be more distant than the imaging element surface if viewed from a main plane of a final lens in the lens disposition, expansion is carried out by the electronic magnification change mechanism in order to compensate for widening of an angle of view together with movement of the moving group caused by focusing.

According to twentieth aspect of the present invention, there is provided an imaging apparatus according to the sixth aspect, wherein, when, in one lens disposition at a high magnification side, a focal surface corresponding to an object of interest is present to be closer than the imaging element surface if viewed from a main plane of a final lens in the lens disposition, expansion is carried out by the electronic magnification change mechanism in order to compensate for widening of an angle of view together with movement of the moving group caused by focusing.

According to a twenty-first aspect of the present invention, there is provided an imaging apparatus according to the seventh aspect, wherein, when, in one lens disposition at a high magnification side, a focal surface corresponding to an object of interest is present to be closer than the imaging element surface if viewed from a main plane of a final lens in the lens disposition, expansion is carried out by the electronic magnification change mechanism in order to compensate for widening of an angle of view together with movement of the moving group caused by focusing.

According to a twenty-second aspect of the present invention, there is provided an imaging apparatus according to the sixth aspect, wherein, when, in one lens disposition at a high magnification side, a focal surface corresponding to an object of interest is present to be more distant than the imaging element surface if viewed from a main plane of a final lens in the lens disposition, the reduction process is carried out by the electronic magnification change mechanism in order to compensate for high magnification of an angle of view together with movement of the moving group caused by focusing.

According to a twenty-third aspect of the present invention, there is provided an imaging apparatus according to the seventh aspect, wherein, when, in one lens disposition at a high magnification side, a focal surface corresponding to an object of interest is present to be more distant than the imaging element surface if viewed from a main plane of a final lens in the lens disposition, the reduction process is carried out by the electronic magnification change mechanism in order to compensate for high magnification of an angle of view together with movement of the moving group caused by focusing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 shows an operation (state transition) of a pipeline process of a filter processing section 142 shown in FIG. 4;

DETAILED DESCRIPTION OF THE INVENTION

Figure 1:
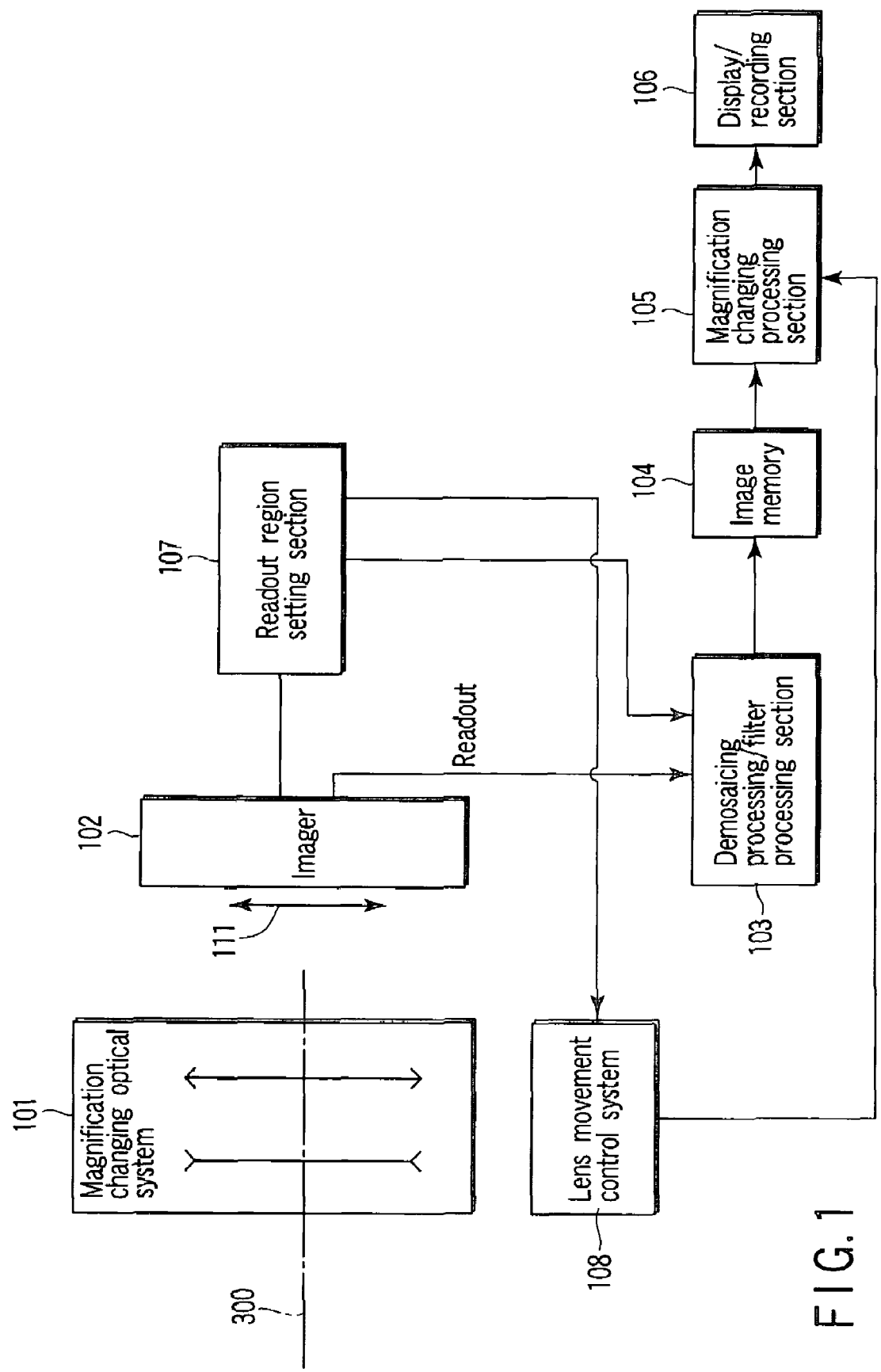
FIG. 1 is a diagram showing a configuration of an imaging apparatus to which the present invention is applied.

Hereinafter, one embodiment of the present invention will be described with reference to the accompanying drawings. FIG. 1 is a diagram showing a configuration of an imaging apparatus to which the present invention is applied, wherein the imaging apparatus includes an imaging system having optical zooming and a signal processing system for electronically changing a magnification. Movement of a magnification changing optical system 101 is controlled by a lens movement control system 108, thereby changing an image forming magnification on an imager 102 and carrying out optical zooming. In addition, a filter process in the case where a demosaicing process (full coloring) at a demosaicing processing/filter processing section and thinning out readout as described later have been carried out is carried out for an image signal photoelectrically converted by the imager 102. The filter-processed image data is stored in an image memory 104. A magnification changing processing section 105 carries out a magnification changing process in accordance with a technique such as linear interpolation by using the image data recorded in the image memory 104.

Thereafter, the image data is transmitted to a display/recording section 106 to be displayed/recorded. A readout region setting section 107, as described later, is a section which reads out a predetermined range from among the pixels on the imager 102 in accordance with a predetermined readout rule. The readout region setting section 107 further provides a signal relating to information on magnification change to the lens movement control system 108, the demosaicing processing/filter processing section 103, and the imager 102.

Figure 2A:
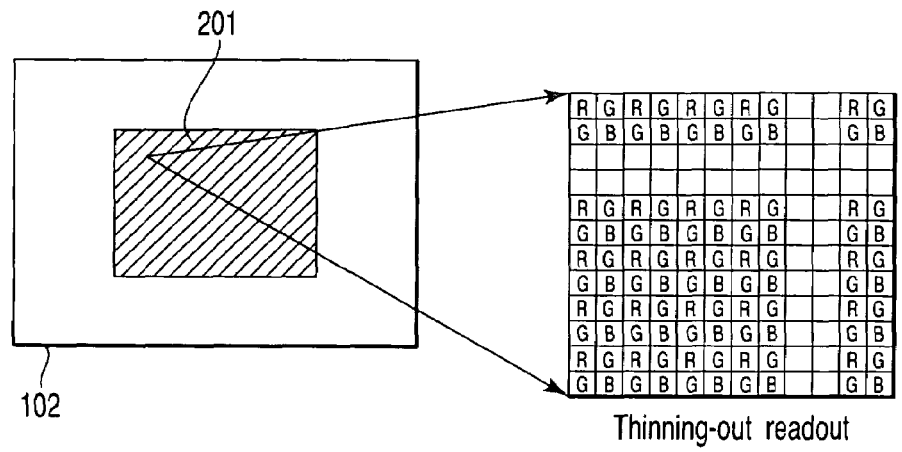
FIGS. 2A to 2C are views for explaining a magnification change using electronic zooming.
Figure 2B:
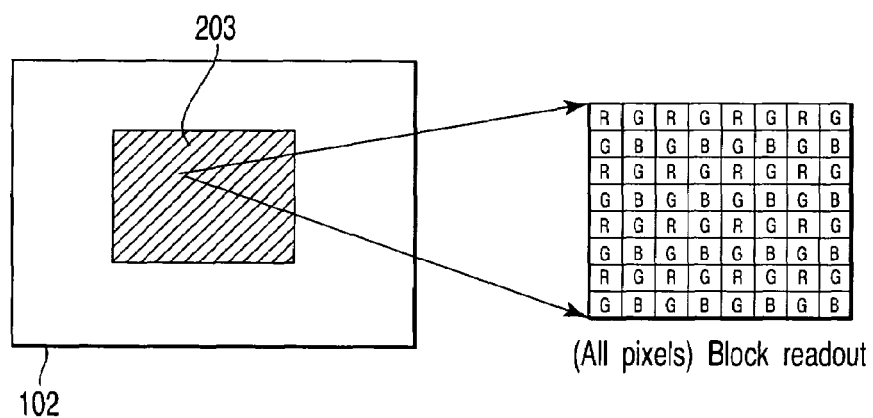
Figure 2C:
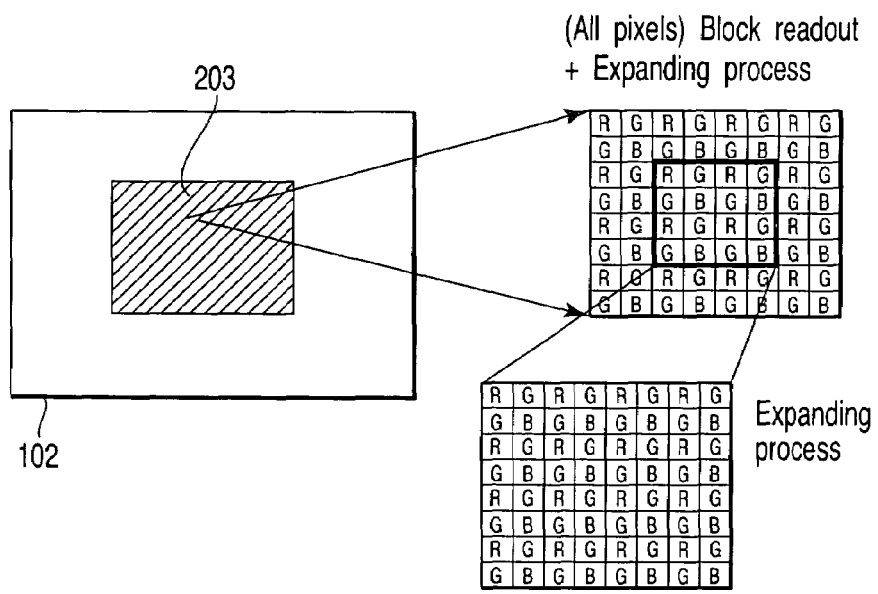

FIGS. 2A to 2C are views for explaining a magnification change using electronic zooming. FIG. 2A shows an example of a reduction process, FIG. 2B shows an example of full pixel readout, and FIG. 2C shows an example of an expansion process.

In the full pixel readout shown in FIG. 2B, all pixels of a region on the imager 102 are sampled, and an image is formed without carrying out electronic magnification change. In contrast, in the thinning-out readout shown in FIG. 2A, pixel data contained in a readout region 201 which is wider than a readout region 203 shown in FIG. 2B is read out by thinning-out, and an image of size which is equal to that shown in FIG. 2B is finally formed. Therefore, this implies that the reduction process is carried out in the sampling shown in FIG. 2A.

The filter processing section 103 shown in FIG. 1 carries out correction of as image distortion or the like in the case where thinning-out readout has been carried out.

In the process shown in FIG. 2C, full pixel readout similar to that shown in FIG. 2B is carried out, and then, magnification change is made by the magnification change section 105 shown in FIG. 1. An image of size which is equal to that of an image generated by carrying out full pixel readout is formed from a partial region of the image data obtained by the full pixel readout shown in FIG. 2B. Therefore, this implies that the expansion process is carried out in the process shown in FIG. 2C.

Figure 11:
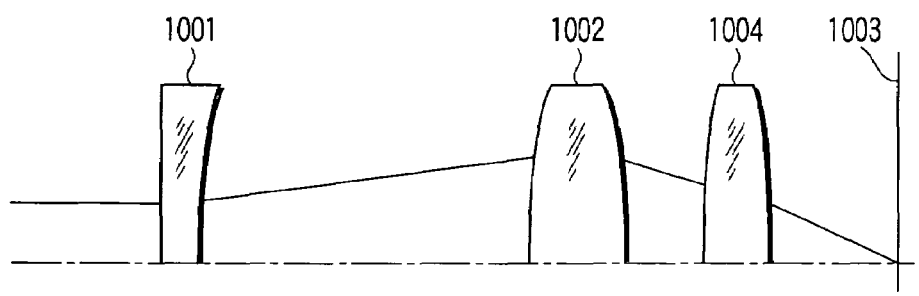
FIG. 11 is a view showing a conventional optical system composed of negative, positive, and positive configurations.
Figure 12:
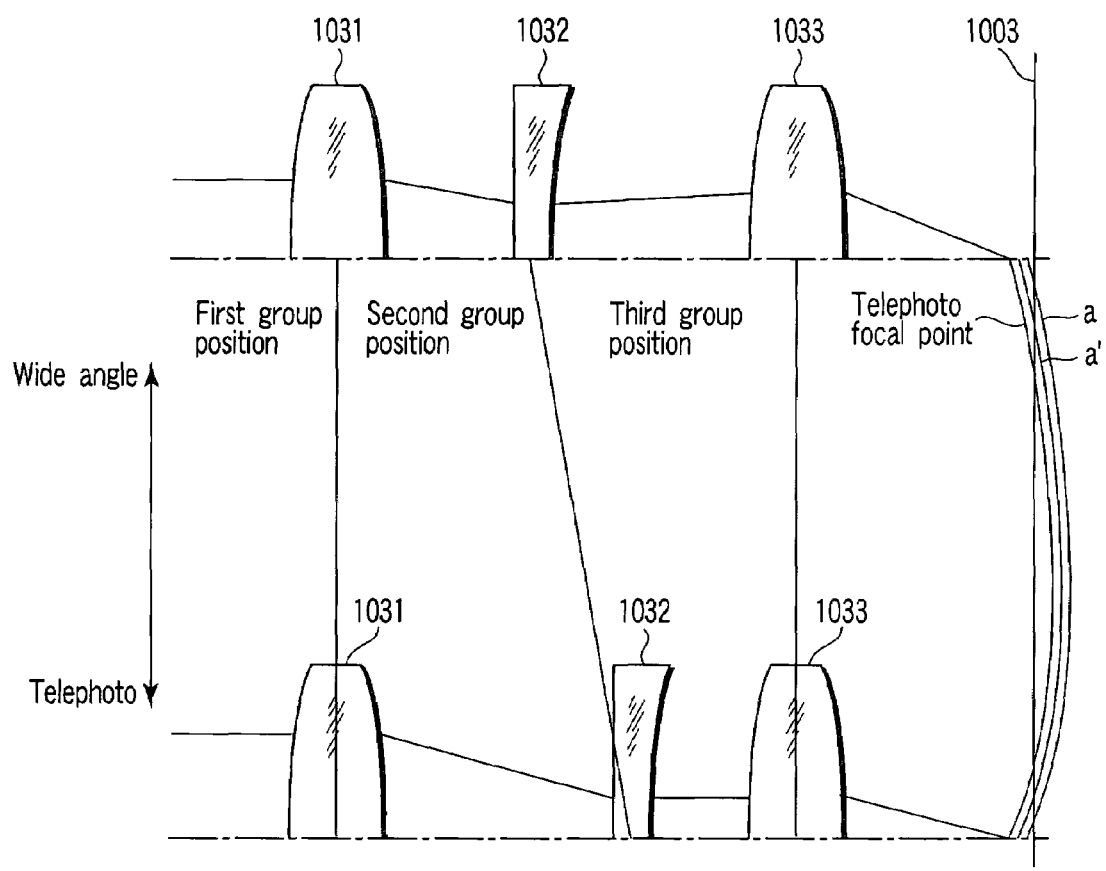
FIG. 12 is a view showing a conventional optical system composed of positive, negative, and positive configurations.
Figure 13:
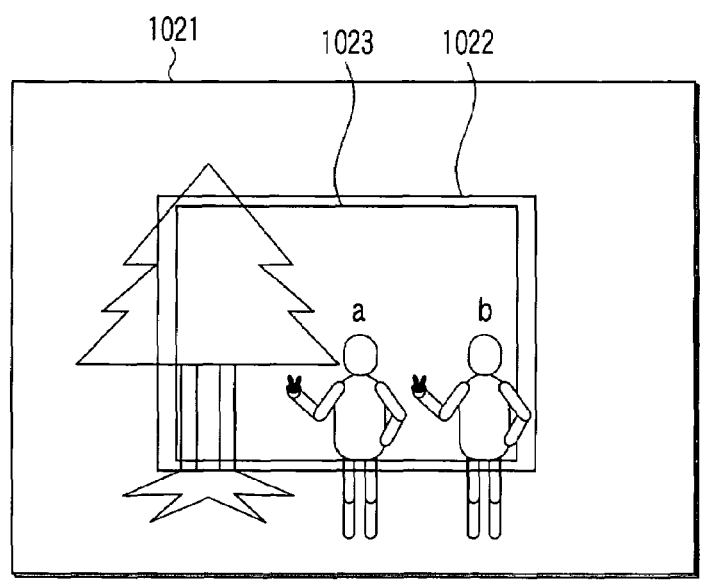
FIG. 13 is a view for explaining a problem with a conventional optical system.

As explained with respect to FIG. 13, in the optical system shown in FIG. 11, there has been a problem that a focus and an angle of view change at the same time. In addition to the optical system shown in FIG. 11, an optical magnification changing mechanism having a three-group configuration as shown in FIG. 12 is provided. The mechanism is an optical system which includes a first lens group 1031 having a positive refractive power, the first lens group being fixed during magnification change and focusing; a second lens group 1032 having a negative refractive power, the second lens group moving during magnification change or focusing; and a third lens group 1033 having a positive refractive power, the third group force being fixed during magnification change or focusing, from an object side. In the optical system, a telephoto focal surface moves as illustrated as the second lens group moves. Therefore, in this case as well, when a design has been made so that a telephoto image is formed on an image surface at a certain zoom magnification (focal distance) A, there are only a maximum of two zoom magnifications including A, such that the telephoto image is formed on the image surface, in the same manner as that described above. Similarly, there are only a maximum of two zoom magnifications such that an image can be focused at a predetermined focal distance, and an angle of view also changes during focusing, as described above.

Then, correction of an angle of view is carried out so as to cancel a magnification changed by focusing in accordance with an electronic magnification changing method described below with reference to FIG. 3.

Figure 3A:
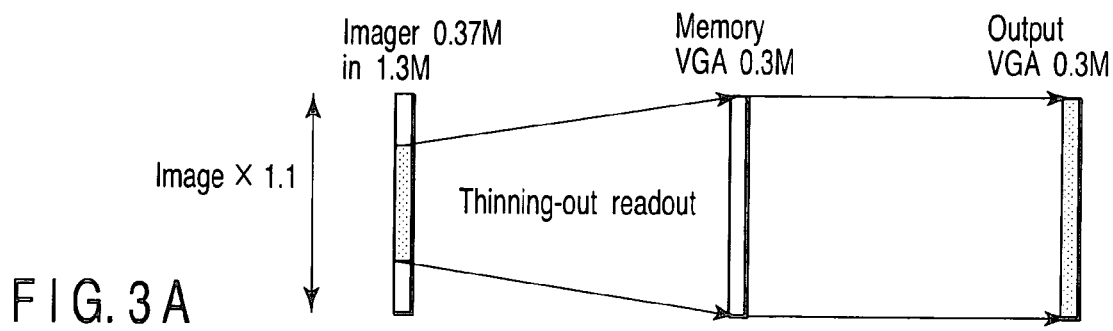
FIGS. 3A to 3C are views for explaining correction of an angle of view.
Figure 3B:
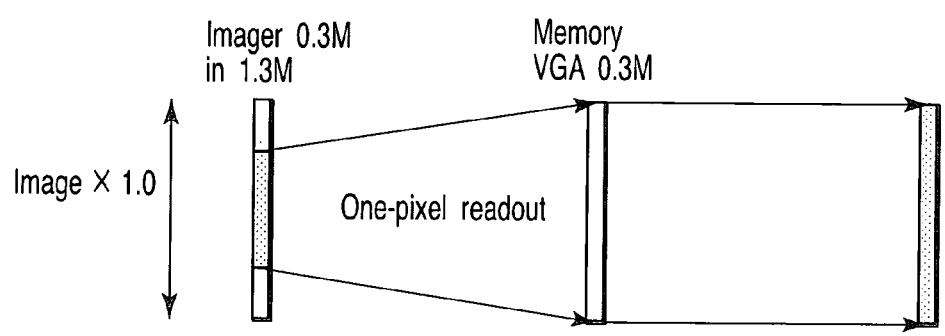
Figure 3C:
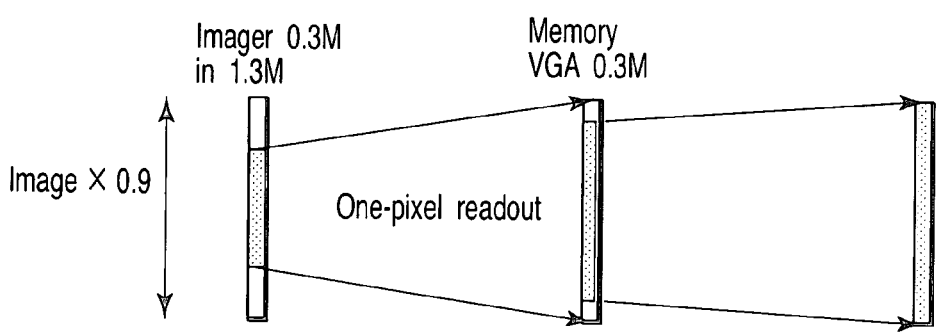

FIG. 3A shows a method of storing and outputting pixels of 0.3 M (VGA) in a memory by means of thinning-out readout from pixels of 0.37 M in an imager of 1.3 M, wherein the current state corresponds to a wide angle (WIDE) state. FIG. 3B shows a method of reading out one pixel from pixels of 0.3 M in an imager of 1.3 M, and storing and outputting it in a memory as is. FIG. 3C shows a method of reading out one pixel from pixels of 0.3 M in an imager of 1.3 M, storing it in a memory, reading out data of 0.25 M therefrom, and expanding and outputting the data to 0.3 M, wherein the current state corresponds to a telephoto (TELE) state.

That is, when an angle of view has been changed from ×0.9 (FIG. 3C) to ×1 (FIG. 3B), and then, to ×1.1 (FIG. 3A) by means of focusing, an electronic magnification changing process is carried out so as to expand an image reduced at the time of ×0.9 and so as to reduce an image expanded at ×1.1.

When, in the configuration shown in FIG. 1, a directional focus of an angle of view which changes due to focusing from a state of a lens control system has been moved to a wide angle direction, an expanding process is carried out in a direction in which such movement is eliminated. Conversely, when the above focus has been moved to an expanding direction, a reducing process is carried out so as to eliminate such movement.

Therefore, in the case where an object is distant at the wide-angle side in a negative and positive configuration as shown in FIG. 11 or in a positive, negative, and positive configuration as shown in FIG. 12, an image expanding process is carried out so as to restrict a change of an angle of view. At the telephoto side, conversely, a change of an angle of view is compensated for by the reducing process. In this case, conversely, at the wide side, an angle of view changes in a narrower direction with respect to a distant object, and, at the telephoto side, this angle is compensated for because it changes at a wider angle.

In addition, an algorithm of angle-of-view compensation can be selectively stopped for a user who does not intend to carry out such a process.

In the meantime, when an electronic magnification change is made, the expanding process and reducing process are carried out. In the case of carrying out the reducing process, a region of the pixels whose number is larger than that of images to be output is acquired on the imager 102, and an output image is generated by a magnification changing process such as an interpolating process. In this case, a total clock number of the acquired pixels is different depending on the size of an area to be imaged. That is, as a magnification changes to the wide-angle side, a larger number of clocks is required. In other words, as long as there occurs a use situation such that no problem occurs even if the clock number or processing time of imaging for acquiring one screen changes due to an angle of view (zooming), there is no need for carrying out readout using pixel mixing or thinning-out readout as shown in FIG. 2. In contrast, as shown in FIG. 2, only width of a readout region can be changed without changing the number of clocks by using thinning-out readout.

However, merely by carrying out thinning-out readout, image distortion occurs and image quality degradation is unavoidable, for example, when an inter-frame interpolation process has been carried out. A filter process is carried out such that an image produced by thinning-out readout is reduced to the minimum.

Figure 4:
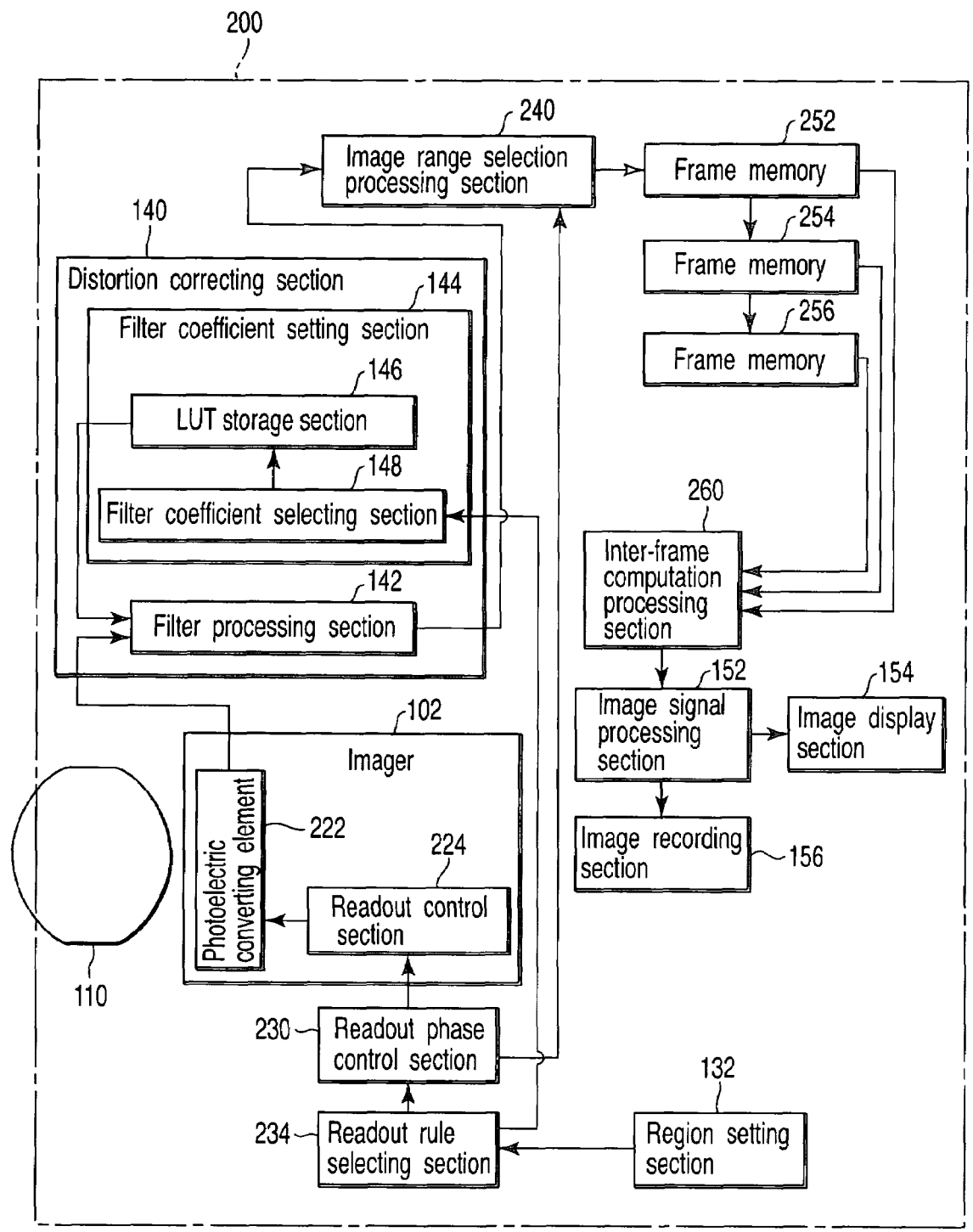
FIG. 4 is a diagram showing a configuration of an imaging apparatus 200 comprising a distortion correcting unit which carries out a distortion correcting process.

FIG. 4 shows a configuration of an imaging apparatus 200 comprising a distortion correcting section which carries out a distortion correcting process after carrying out thinning-out readout of a pixel on the imager 102. The imaging apparatus 200 has: the optical magnification changing system 101 which forms an optical image of an object; and the imager 102 which outputs an image signal in a predetermined region of the optical image formed by the optical magnification changing system 101.

The imager 102 has an area-shaped photoelectric converting element 222 which photoelectrically converts the optical image formed by the optical magnification changing system 101 to acquire digital image data (a set of pixel data); and a readout control section 224 which reads out by thinning-out the image data acquired by the photoelectric converting element 222 as required.

Further, a region setting section 132 sets which region of the imager 102 is output as an image. A readout rule selecting section 234 is a section which selects a readout rule on the basis of the set readout region. A readout phase control section 230 is a section which shifts a reference position of a range of pixel data read out by the readout control section 224.

Here, in the case where a difference is present between a size of an image to be output and a size of a region on the imager 102, the image on the imager 102 is read out by thinning-out, and further, is subjected to distortion correction by a distortion correcting process section 140. The distortion correcting section 140 has a filter coefficient setting section 144 and a filter processing section 142, the filter coefficient setting section 144 having a LUT storage section 146 and a filter coefficient selecting section 148.

Figure 5:
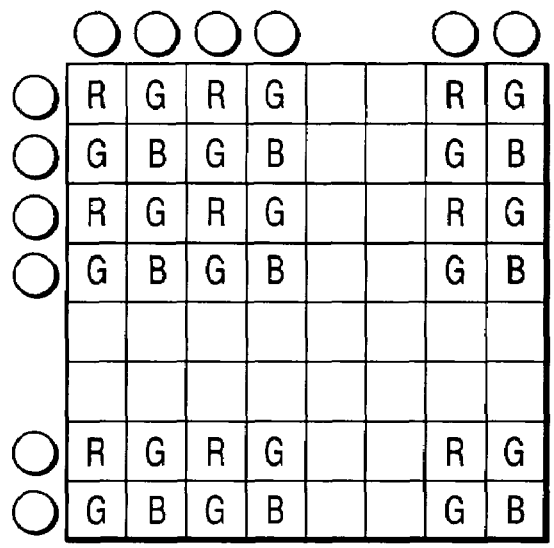
FIG. 5 is a view of thinning-out readout in which two of eight pixels is read out in each of a horizontal direction and a vertical direction.
Figure 6B:
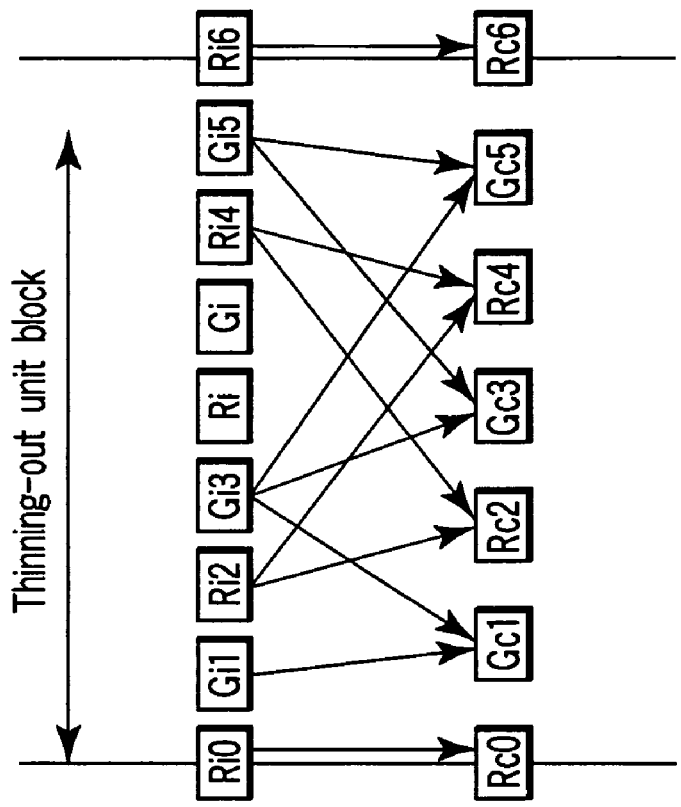
FIG. 6B is a conceptual view (example 2) of the distortion correcting process.
Figure 6A:
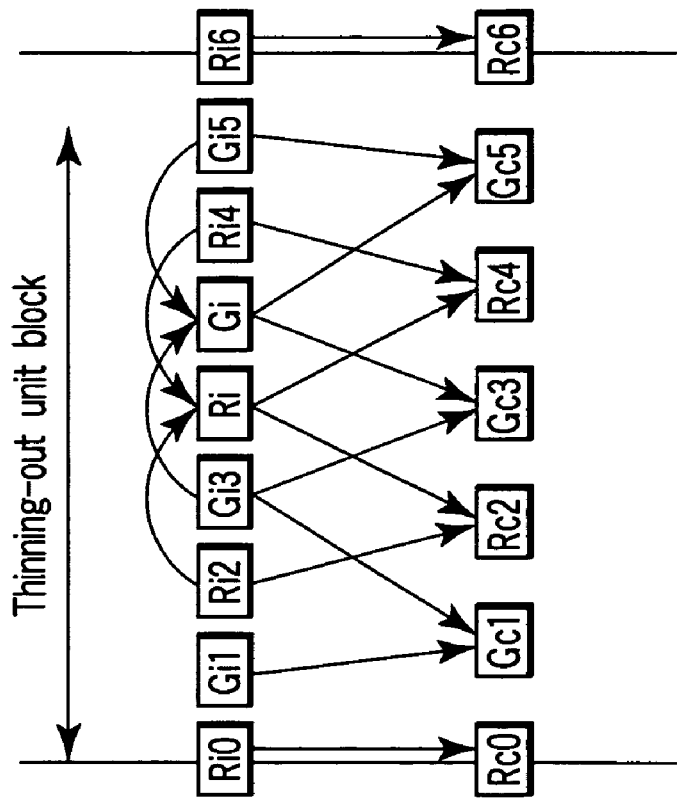
FIG. 6A is a conceptual view (example 1) of the distortion correcting process.

Now, a distortion correcting process for thinning-out readout will be described in detail. FIG. 5 shows an example of thinning-out readout in which two of eight pixels is read out in each of a horizontal direction and a vertical direction. A step is produced on an image in the readout method according to the example of FIG. 5. Therefore, as shown in FIG. 6A, let us consider an operation of padding a skipped pixel in accordance with linear interpolation using the peripheral pixels, thereby producing eight-pixel data, and changing the produced data to six-pixel data in accordance with linear interpolation. That is, as shown in FIG. 6B, a process for changing samplings at non-uniform pixel intervals to uniform samplings is carried out.

Figure 7:
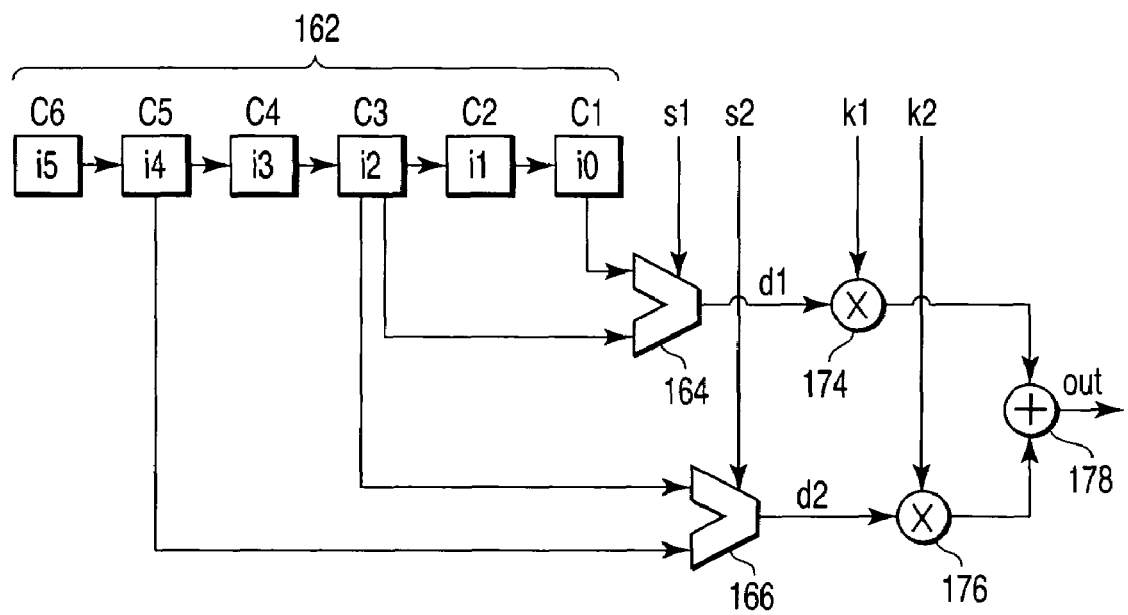
FIG. 7 is a diagram showing a pipeline configuration of the thinning-out readout process.

Here, let us consider readout of one line with thinning-out. FIG. 7 shows a pipeline configuration of the thinning-out readout process, wherein the pipeline configuration is composed of a shift register 162, a pair of selectors 164 and 166, a pair of multipliers 174 and 176, and an adder 178. The pixel positions read out with the top left shown in FIG. 5 being a reference are Ri0, Gi1, Ri2, Gi3, Ri4, Gi5, Ri6, and Gi7, and subsequently, repetition in the same rule is achieved. Matrix expression of distortion correction (change) in this example is obtained by:

$$\begin{pmatrix} Rc_0 \\ Gc_1 \\ Rc_2 \\ Gc_3 \\ Rc_4 \\ Gc_5 \end{pmatrix} = \begin{pmatrix} 1 & 0 & 0 & 0 & 0 & 0 \\ 0 & \frac{5}{6} & 0 & \frac{1}{6} & 0 & 0 \\ 0 & 0 & \frac{5}{6} & 0 & \frac{1}{6} & 0 \\ 0 & 0 & 0 & \frac{3}{4} & 0 & \frac{1}{4} \\ 0 & 0 & \frac{1}{6} & 0 & \frac{5}{6} & 0 \\ 0 & 0 & 0 & \frac{1}{12} & 0 & \frac{11}{12} \end{pmatrix} \begin{pmatrix} Ri_0 \\ Gi_1 \\ Ri_2 \\ Gi_3 \\ Ri_4 \\ Gi_5 \end{pmatrix} \quad (2)$$

In FIG. 7, the shift register 162 shifts maintained image data a one by one basis in a right direction every one operation that follows a clock. The selector 164 selects either of a first item and a third item from among five items of pixel data i0 to i5 adjacent thereto, the pixel data being maintained in the shift register 162. In addition, the selector 166 selects either of a third item and a fifth item from among five items of pixel data i0 to i5 adjacent to each other, the pixel data being maintained in the shift register 162 in accordance with a selection signal 2.

The multiplexer 174 multiplies a coefficient k1 of a weighted addition for an output d1 of the selector 164; the multiplier 176 multiplies a coefficient k2 of a weighted addition for an output d2 of the selector 166; and the adder 178 adds an output of a multiplier 194 and an output of a multiplexer 196.

FIG. 8 represents an operation (state transition) of a pipeline process at the filter processing section 142 shown in FIG. 4.

A pixel data train (i0, i1, i2, . . . ) supplied to the shift register 162 is shifted in the right direction every one operation that follows a clock while C1=i0, C2=i1, C3=i2, . . . are defined as an initial state. Concurrently, the selector 164 selects C1 when s1 is 0 (therefore, d1=C1 is obtained), and selects C3 when s1 is 1 (therefore, d1=C3 is obtained). On the other hand, the selector 166 selects C3 when s2 is 1, and selects C5 when s2 is 1 (therefore, d2=C5 is obtained.)

In addition, in synchronism with a clock, the coefficient k1 and the coefficient k2 are supplied to the multiplexer 174 and the multiplexer 176, respectively, from the memory contained in the filter coefficient setting section 144 shown in FIG. 4. Therefore, out=k1 ×d1 +k2 ×d2 is output from the adder 178.

As is evident from FIG. 8, a pipeline process including a pixel phase operation (selector changing) is carried out by carrying out shifting of serial data; selector switching in accordance with a state of s1 and s2 ; outputting the weight coefficients k1 and k2 in accordance with the thinning-out rule shown in formula (2); and a weighting additive computation in synchronism with each other.

An imaging apparatus according to the present embodiment assumes a case of a mobile image as an input image, so that an interlace operation interpolates pixel data which are missing each other between the two continuous frames so as to interpolate pixel data which is missing each other between two fields. For example, the readout phase control section 230 shifts a reference position of a range of the pixel data read out by the readout control section 224 such that image data in a plurality of continuous frames does not have these items of the entirely missing pixel data. It is preferable that a shift quantity be in order of two to eight pixels.

Figure 9A:
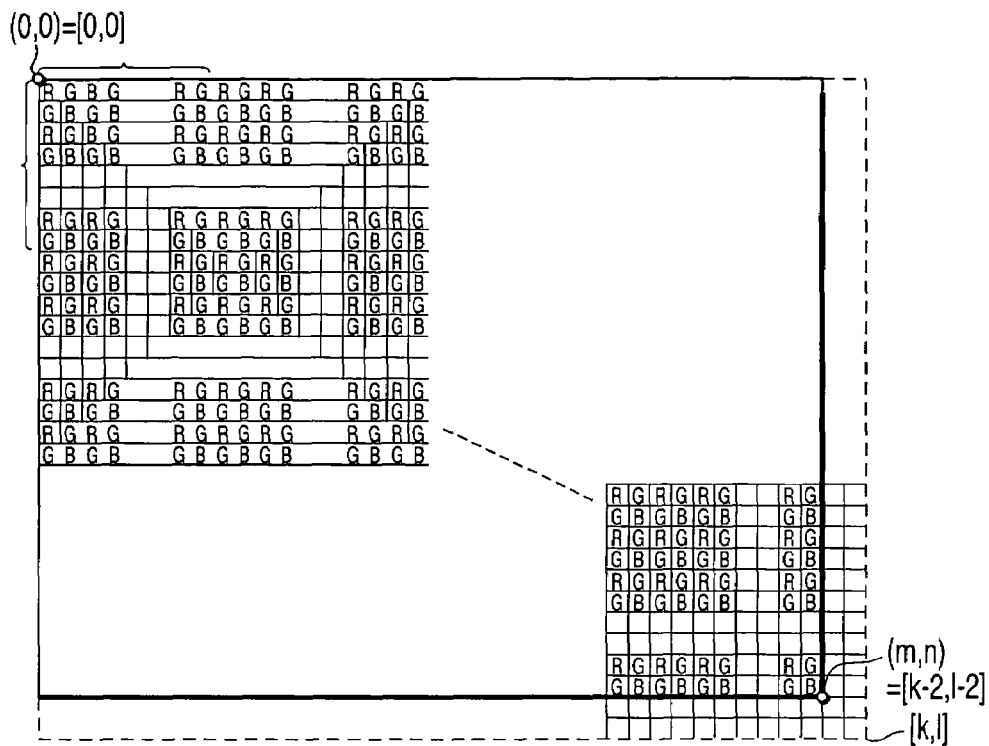
FIG. 9A is a view (example 1) schematically showing how a reference position is shifted in a readout range in repetitive readout of 6/8 thinning-out readout.
Figure 9B:
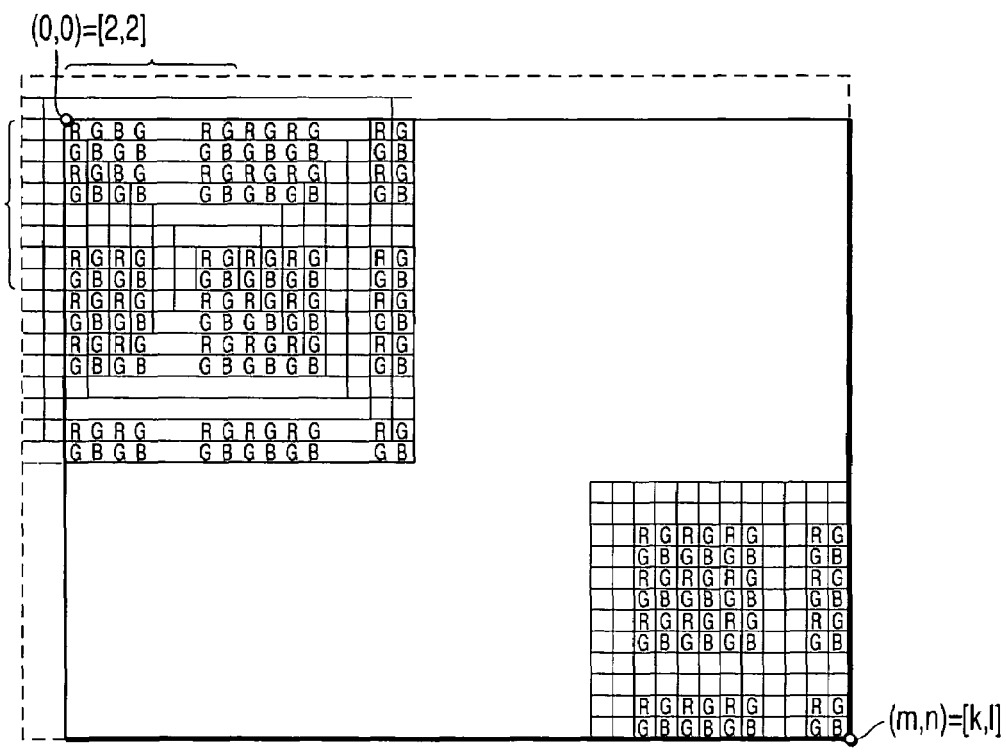
FIG. 9B is a view (example 2) schematically showing how a reference position is shifted in a readout range in repetitive readout of 6/8 thinning-out readout.
Figure 10:
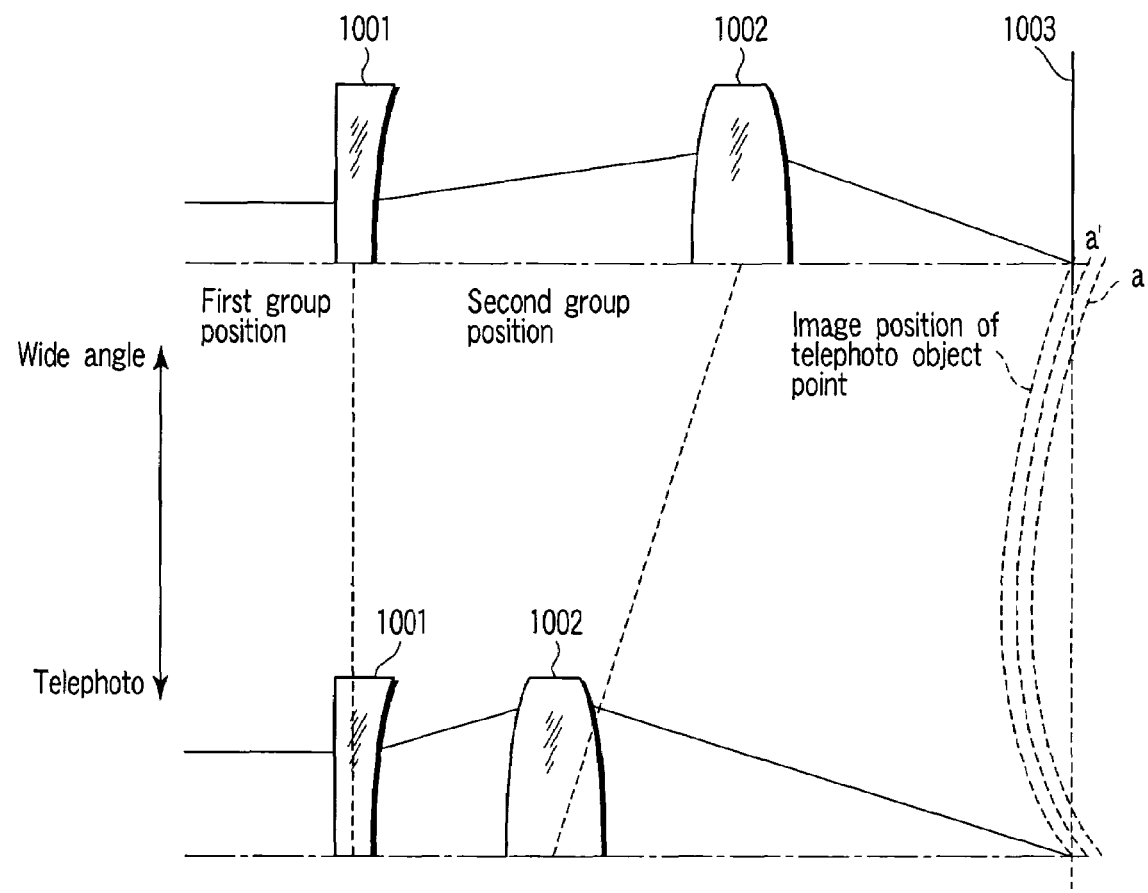
FIG. 10 is a view showing a conventional optical system composed of negative and positive configurations.

FIGS. 9A and 9B schematically shows how a reference position is shifted within the readout range in repetitive readout of 6/8 thinning-out readout. In FIGS. 9A and 9B, [x, y] represents a pixel position of a pixel array of a photoelectric converting element 222 and (x, y) represents pixel data in the readout range.

As shown in FIGS. 9A and 9B, the number of pixels of the photoelectric converting element 222 can be represented as [0, 0], and the position of the bottom right pixel can be represented as [k, 1]. In addition, the number of pixels in the readout range of one frame are "m" pixels in a horizontal direction and "n" pixels in a vertical direction, respectively. Therefore, the readout start position at the top left of the frame can be represented as (0, 0), and the readout end position at the bottom right thereof can be represented as (m, n). The readout range of the frame shown in FIG. 9B is shifted by +2 pixels in the horizontal direction and +2 pixels in the vertical direction with respect to the readout range of the frame shown in FIG. 9A.

In the frame shown in FIG. 9A, the top left readout start position (0, 0) coincides with the top left pixel position [0, 0] of the photoelectric converting element 222. Namely, $$(0, 0) = [0, 0] \quad (3)$$

is obtained. In addition, the readout end position (m, n) is:

$$(m, n) = [k-1, i-2] \quad (4)$$

On the other hand, in the frame shown in FIG. 9B, the top left readout start position is:

$$(0, 0) = [2, 2] \quad (5)$$

In addition, the readout end position is:

$$(m, n) = [k, 1] \quad (6)$$

An image range selection processing section 240 selects a range common to the frame shown in FIG. 9A and the frame shown in FIG. 9B. That is, a range of a rectangle with (2, 2) and (m, n) being diagonal apexes is selected with respect to the frame shown in FIG. 9B, and a range of a rectangle with (0, 0) to (m–2, n–2) being diagonal apexes is selected with respect to the frame shown in FIG. 9A. The range selected by the image range selection processing section 240 always has (m–2)×(n–2) items of pixel data.

In addition, in consideration of a range to be cropped in advance, it is necessary to configure an image size and a phase shift component of an output for a total number of images read out from the imager 102. The image range selection processing section 240 changes a cropping range on the basis of information on the readout start position.

Frame memories 252, 254, and 256 are First-In First-Out (FIFO) memories, and an inter-frame computation processing section 260 generates an output image by using the data contained in a first frame which are present in their frame memories 252, 254, and 256 and the pixels at the same positions in a second frame which is different from the first frame.

For example, in the case of two frames, a composite image out(i, j) is:

$$\text{out}(i, j) = 0.5 l(k, i, j) + 0.5 l(k-1, i, j) \quad (7)$$

Here, i, j represents a pixel position, and l (k, i, j) denotes intensity of an image signal at the pixel positions i, j of a k-th frame.

In addition, in the case of three frames, by using a weighted component, a composite image out(i, j) is obtained as follows:

$$\text{out}(i, j) = 0.251(k, i, j) + 0.51(k-1, i, j) + 0.251(k-2, i, j) \quad (8)$$

Image data read out in the readout rules different from between a plurality of frames, with respect to the image data being subjected to a distortion correction filter process, a position shift of an image between frames is corrected by the image range selection processing section 240. Data for a predetermined frame is accumulated by the frame memories 252, 254, and 256; inter-frame computation is carried out by an inter-frame computation processing section 250; and predetermined processing operation is carried out by an image signal processing section 152. Then, data is output to an image display section 154 and an image recording section 156. By carrying out inter-frame interpolation, in addition to advantage effect of distortion correction, an image smoothing effect using a low path can be obtained.

In this manner, a change of an angle of view produced when carrying out focusing in an imaging apparatus comprising an optical magnification changing mechanism in which a focal position changes is compensated for together with a focal distance by means of an expansion/reduction electronic magnification changing process, thereby enabling imaging at an angle of view intended by a user and making it possible to suppress a change of the angle of view caused by movement of an object.

What is claimed is:

1. An imaging apparatus having an imaging element which converts an optically formed image to an electrical signal by means of photoelectric conversion, thereby acquiring image data, the imaging apparatus comprising:
    an optical magnification changing mechanism which optically changes a magnification of an image; and
    an electronic magnification change mechanism which reduces or expands a magnification with respect to image data by signal processing,
    wherein the imaging apparatus provides a magnification-changed image according to a predetermined magnification based on the optical magnification changing mechanism and the electronic magnification change mechanism,
    wherein the optical magnification changing mechanism is configured so that a magnification is discrete and a focal position changes together with a focal distance, and
    wherein the electronic magnification change mechanism:
    (i) carries out an interpolating process such that a number of pixels is increased with respect to a predetermined region of read image data during an expanding process; and (ii) carries out a process for discretely sampling a wide region as compared with a readout region obtained by sampling provided when no magnification change is made, during a reducing process, and converting sampled region data to predetermined image data by a correcting process, thereby offsetting a change of the focal position in the optical magnification changing mechanism.

2. An imaging apparatus according to claim 1, further comprising a focus adjusting section which detects a focus state of an object and moves a movable section of the optical magnification changing mechanism according to a result of the detection.

3. An imaging apparatus according to claim 1, wherein the optical magnification changing mechanism includes an optical system in which a magnification is produced as x−1 at an arbitrary position in an interval at which a partial group having a largest change of a delay magnification relating to a telephoto point during movement can move from among partial groups of lens systems which move on an optical axis.

4. An imaging apparatus according to claim 1, wherein the optical magnification changing mechanism includes an optical system which includes:
    a first lens group fixed during magnification change/focusing; and
    a second lens group that moves during magnification change or focusing sequentially from an object side, and in which a magnification is produced as x−1 at an arbitrary position in an interval at which the second lens group can move.

5. An imaging apparatus according to claim 1, wherein a total number of pixels read from the imaging element for the expanding process by the electronic magnification change mechanism and a total number of pixels read from the imaging element for the reducing process by the electronic magnification change mechanism are constant.

6. An imaging apparatus according to claim 1, wherein the optical magnification changing mechanism includes an optical system which includes:
    a first lens group having a negative refractive power, the first lens group being fixed during magnification change/focusing; and
    a second lens group having a positive refractive power, the second lens group moving during magnification change or focusing, sequentially from an object side, and in which a magnification is produced as x−1 at an arbitrary position in an interval at which the second lens group can move.

7. An imaging apparatus according to claim 6, wherein, when, in one lens disposition at a wide-angle side, a focal surface corresponding to an object of interest is present to be closer than an imaging element surface if viewed from a main plane of a final lens in the lens disposition, the expanding process is carried out by the electronic magnification change mechanism in order to compensate for widening of an angle of view together with movement of a moving group caused by focusing.

8. An imaging apparatus according to claim 6, wherein, when, in one lens disposition at a wide-angle side, a focal surface corresponding to an object of interest is present to be more distant than an imaging element surface if viewed from a main plane of a final lens in the lens disposition, the reducing process is carried out by the electronic magnification change mechanism in order to compensate for high magnification of an angle of view together with movement of a moving group caused by focusing.

9. An imaging apparatus according to claim 6, wherein, when, in one lens disposition at a high magnification side, a focal surface corresponding to an object of interest is present to be closer than an imaging element surface if viewed from a main plane of a final lens in the lens disposition, the reducing process is carried out by the electronic magnification change mechanism in order to compensate for high magnification of an angle of view together with movement of a moving group caused by focusing.

10. An imaging apparatus according to claim 6, wherein, when, in one lens disposition at a high magnification side, a focal surface corresponding to an object of interest is present to be more distant than an imaging element surface if viewed from a main plane of a final lens in the lens disposition, the expanding process is carried out by the electronic magnification change mechanism in order to compensate for widening of an angle of view together with movement of a moving group caused by focusing.

11. An imaging apparatus according to claim 6, wherein, when, in one lens disposition at a wide-angle side, a focal surface corresponding to an object of interest is present to be more distant than an imaging element surface if viewed from a main plane of a final lens in the lens disposition, expansion is carried out by the electronic magnification change mechanism in order to compensate for widening of an angle of view together with movement of a moving group caused by focusing.

12. An imaging apparatus according to claim 6, wherein, when, in one lens disposition at a high magnification side, a focal surface corresponding to an object of interest is present to be closer than an imaging element surface if viewed from a main plane of a final lens in the lens disposition, expansion is carried out by the electronic magnification change mechanism in order to compensate for widening of an angle of view together with movement of a moving group caused by focusing.

13. An imaging apparatus according to claim 6, wherein, when, in one lens disposition at a high magnification side, a focal surface corresponding to an object of interest is present to be more distant than an imaging element surface if viewed from a main plane of a final lens in the lens disposition, the reduction process is carried out by the electronic magnification change mechanism in order to compensate for high magnification of an angle of view together with movement of a moving group caused by focusing.

14. An imaging apparatus according to claim 1, wherein the optical magnification changing mechanism includes an optical system which includes:
   a first lens group having a negative refractive power, the first lens group being fixed during magnification change/focusing;
   a second lens group having a positive refractive power, the second lens group moving during magnification change or focusing; and
   a third lens group having a positive refractive power, the third lens group being fixed during magnification change/focusing, sequentially from an object side, and in which a magnification is produced as x−1 at an arbitrary position in an interval at which the second lens group can move.

15. An imaging apparatus according to claim 14, wherein, when, in one lens disposition at a wide-angle side, a focal surface corresponding to an object of interest is present to be closer than an imaging element surface if viewed from a main plane of a final lens in the lens disposition, the expanding process is carried out by the electronic magnification change mechanism in order to compensate for widening of an angle of view together with movement of a moving group caused by focusing.

16. An imaging apparatus according to claim 14, wherein, when, in one lens disposition at a wide-angle side, a focal surface corresponding to an object of interest is present to be more distant than an imaging element surface if viewed from a main plane of a final lens in the lens disposition, the reducing process is carried out by the electronic magnification change mechanism in order to compensate for high magnification of an angle of view together with movement of a moving group caused by focusing.

17. An imaging apparatus according to claim 14, wherein, when, in one lens disposition at a high magnification side, a focal surface corresponding to an object of interest is present to be closer than an imaging element surface if viewed from a main plane of a final lens in the lens disposition, the reducing process is carried out by the electronic magnification change mechanism in order to compensate for high magnification of an angle of view together with movement of a moving group caused by focusing.

18. An imaging apparatus according to claim 14, wherein, when, in one lens disposition at a high magnification side, a focal surface corresponding to an object of interest is present to be more distant than an imaging element surface if viewed from a main plane of a final lens in the lens disposition, the expanding process is carried out by the electronic magnification change mechanism in order to compensate for widening of an angle of view together with movement of a moving group caused by focusing.

19. An imaging apparatus according to claim 14, wherein, when, in one lens disposition at a wide-angle side, a focal surface corresponding to an object of interest is present to be more distant than an imaging element surface if viewed from a main plane of a final lens in the lens disposition, expansion is carried out by the electronic magnification change mechanism in order to compensate for widening of an angle of view together with movement of a moving group caused by focusing.

20. An imaging apparatus according to claim 14, wherein, when, in one lens disposition at a high magnification side, a focal surface corresponding to an object of interest is present to be closer than an imaging element surface if viewed from a main plane of a final lens in the lens disposition, expansion is carried out by the electronic magnification change mechanism in order to compensate for widening of an angle of view together with movement of a moving group caused by focusing.

21. An imaging apparatus according to claim 14, wherein, when, in one lens disposition at a high magnification side, a focal surface corresponding to an object of interest is present to be more distant than an imaging element surface if viewed from a main plane of a final lens in the lens disposition, the reduction process is carried out by the electronic magnification change mechanism in order to compensate for high magnification of an angle of view together with movement of a moving group caused by focusing.

22. An imaging apparatus according to claim 1, wherein the optical magnification changing mechanism includes an optical system which includes:
   a first lens group having a positive refractive power, the first lens group being fixed during magnification change/focusing;
   a second lens group having a negative refractive power, the second lens group moving during magnification change or focusing; and
   a third lens group having a positive refractive power, the third lens group being fixed during magnification change or focusing, and in which a magnification is produced as x−1 at an arbitrary position in an interval at which the second lens group can move.

23. An imaging apparatus according to claim 22, wherein, when, in one lens disposition at a wide-angle side, a focal surface corresponding to an object of interest is present to be closer than an imaging element surface if viewed from a main plane of a final lens in the lens disposition, the reducing process is carried out by the electronic magnification change mechanism in order to compensate for high magnification of an angle of view together with movement of a moving group caused by focusing.

* * * * *